United States Patent [19]

Briet

[11] Patent Number: 4,887,849
[45] Date of Patent: Dec. 19, 1989

[54] CONNECTION SYSTEM FOR INTERCONNECTING A HEAT EXCHANGER AND A PIPE UNION

[75] Inventor: Gilles Briet, Gueugnon, France
[73] Assignee: Hutchinson, France
[21] Appl. No.: 305,803
[22] Filed: Feb. 2, 1989

[30] Foreign Application Priority Data

Feb. 2, 1988 [FR] France .................. 8801186

[51] Int. Cl.⁴ .......................... F16L 37/00
[52] U.S. Cl. ..................... 285/91; 285/174; 285/319; 285/330; 285/921
[58] Field of Search .............. 285/319, 91, 360, 330, 285/913, 921, 174

[56] References Cited

U.S. PATENT DOCUMENTS

| | | | |
|---|---|---|---|
| 2,250,199 | 7/1941 | Kelly | 285/91 X |
| 2,869,099 | 1/1959 | Robinson | 285/319 X |
| 3,189,372 | 6/1965 | Johnson | 285/91 |
| 3,588,149 | 6/1971 | Demler, Sr. | 285/921 X |
| 3,950,014 | 4/1976 | Doubleday | 285/330 X |
| 4,758,023 | 7/1988 | Vermillion | 285/921 X |
| 4,773,474 | 9/1988 | Stay | 285/319 X |

FOREIGN PATENT DOCUMENTS 2822259 12/1978 Fed. Rep. of Germany ...... 285/921
1503444 10/1967 France .
1565562 3/1969 France .
2249299 5/1975 France .

*Primary Examiner*—Thomas F. Callaghan
*Attorney, Agent, or Firm*—Jacobs & Jacobs

[57] ABSTRACT

A connection system for interconnecting a heat exchanger and a pipe union, in which the pipe union (7) that opens out into a connection tube (4) of the heat exchanger water box (3) is permanently fixed to a flexible pipe (31) and is releasably connected to the tube (4). The leading end of the pipe union (7) has a neck (6) which is divided into a plurality of axial fingers (11) which are resilient in a radial direction and which carry snap-fastening catches (8). The catches (8) are circumferentially spaced apart and they alternate with cylindrical portions of the pipe union. The inside surface of the tube (4) has two sets of axially extending grooves (12, 13). The first set of grooves (12) are catch-receiving grooves for engaging the catches (8) when the union (7) is thrust axially into the tube (4). The second set of grooves (13) are catch-releasing grooves, and the union may be released from the tube by rotating it to bring the catches into alignment with the catch-releasing grooves and then withdrawing it axially. The invention is applicable to providing fast-action releasable connectors for use in the auotmobile industry.

9 Claims, 3 Drawing Sheets

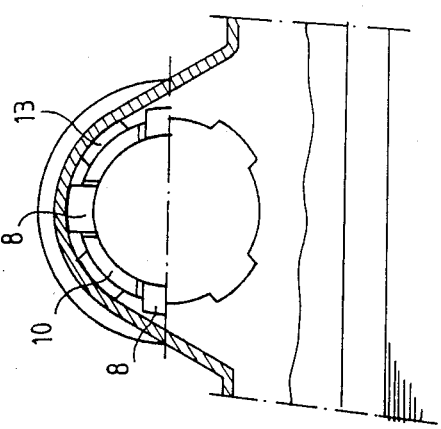
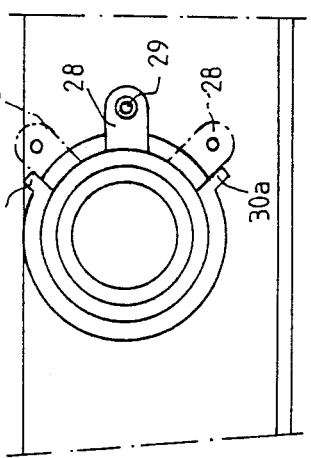
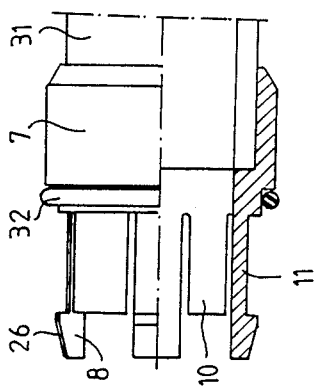
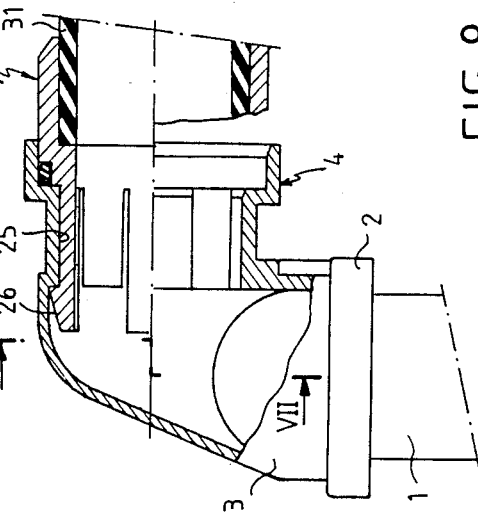
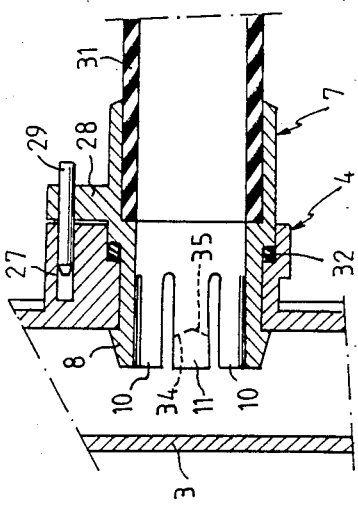

CONNECTION SYSTEM FOR INTERCONNECTING A HEAT EXCHANGER AND A PIPE UNION

The present invention, which was made with the participation of the VALEO Corporation, relates to a connection system for interconnecting a heat exchanger and a pipe union, with the pipe union opening out into a connection tube of the heat exchanger water box and being fixed to the tube via an easily released resilient connection.

BACKGROUND OF THE INVENTION

Connection systems of the above type have already been made of plastic material and they are capable of being assembled and disassembled easily.

In particular, published French patent application number 2,249,299 proposes a pipe union for fixing to a flexible pipe in such a manner as to be resiliently imprisoned in the connection tube of the water box. To this end, the union includes an annular neck with a tapering leading surface for resiliently receiving an internal annular shoulder of the tube. A sealing ring is compressed between said internal shoulder of the tube and an external shoulder on the pipe union.

However, although this prior art solution makes it possible to assemble the pipe union rapidly to the heat exchanger, it does not allow the union to be disassembled therefrom.

The object of the present invention is thus to provide a connection system for interconnecting a heat exchanger and a pipe union which not only provides ease of assembly, but which also enables rapid disassembly.

SUMMARY OF THE INVENTION

The present invention provides a connection system for interconnecting a heat exchanger and a pipe union, with the pipe union opening out into a connection tube of a water box of the heat exchanger, the pipe union being fixed firstly to a flexible pipe by permanent connection means, and secondly to the tube by resilient connection means constituted by cooperation between an annular neck formed in the union and an internal annular shoulder formed in the tube and intended to engage resiliently in said neck, with sealing being provided by an elastomer ring for being radially compressed between the tube and the union, wherein:

said neck is delimited at the leading end of the pipe union by a snap-fastening flange for engaging the internal shoulder of the tube, which flange is discontinuous and constituted by snap-fastening catches which are uniformly spaced around the circumference of said leading end;

the neck includes portions which are delimited by said snap-fastening catches alternating with portions which are not delimited by snap-fastening catches, with those portions of the neck which are not delimited by snap-fastening catches being separated from those portions which are delimited by snap-fastening catches by means of axial slots extending from the leading end of the union over substantially the entire length of the neck, thereby dividing the end of the union into a plurality of axial fingers which carry said catches and which are radially resilient, and a plurality of cylindrical portions for guiding the union inside the tube;

said internal annular shoulder of the tube is also discontinuous, in a manner complementary to said snap-fastening flange, said shoulder comprising a first plurality of axial grooves and a second plurality of axial grooves, with each groove in the first plurality:

being intended to pass a corresponding finger with its snap-fastening catch while the union is being assembled to the tube;

being located between two grooves of said second plurality; and being separated from said grooves of said second plurality by projecting shoulder portions over which said cylindrical portions of the pipe union slide;

whereas each groove of said second plurality serves for releasing a corresponding finger when disconnecting the union from the tube, by rotating the union so as to bring its fingers from a locking position in which they are in alignment with said grooves of the first plurality to an unlocking position in which the fingers are in alignment with the grooves of said second plurality.

In a preferred embodiment of the system of the invention, the snap-fastening teeth have cylindrical leading surfaces and the grooves of said first plurality have flared bottoms for camming them radially inwardly, whereas the grooves of said second plurality have bottoms constituting a cylindrical surface.

In another advantageous embodiment of the system of the invention, the snap-fastening catches have tapering leading surfaces enabling them to be cammed radially inwardly by the grooves of said first plurality which have bottoms constituting a cylindrical surface as do the grooves of said second plurality.

In another preferred embodiment of the system of the invention, the catch of at least one of the resilient fingers is imprisoned in the locked position between two radial locking ribs, and said catch includes a catch-releasing chamfer in a radial snap-fastening surface for passing from the locked position to the unlocked position.

In an advantageous variant of this embodiment, the catch of at least one of the resilient fingers has an axial snap-fastening surface in the form of a projecting V-shape, said surface engaging in an axial V-shaped notch formed in the internal shoulder of the tube.

In another advantageous embodiment of the system of the invention, a transverse notch is provided in the leading edge of one of the tube and the pipe union, said notch being delimited by a radial surface and by first and second axial surfaces, and an axial indexing peg is carried by the other one of the tube and the pipe union, said notch and said peg being disposed in such a manner that when the peg comes into abutment against one of the axial surfaces of said notch, the union is in its locked position, whereas when the peg comes into abutment against the other axial surface of said notch, the union is in its unlocked position.

The invention includes further arrangements in addition to those specified above and which appear in the following description.

BRIEF DESCRIPTION OF THE DRAWINGS

Embodiments of the invention are described by way of example with reference to the accompanying drawings, in which:

FIGS. 5 to 7 show a variant embodiment which differs from that shown in FIGS. 1 to 3, and more precisely:

FIG. 5 is a plan view in partial section through the assembled pipe union and water box connection tube;

FIG. 6 is a side view in half section through the pipe union used in the FIG. 5 assembly;

FIG. 7 is a section view on VII of FIG. 5; and

FIGS. 8 and 9 show a variant of the means for indexing the assembly between the connection tube and the pipe union.

It should naturally be understood that the drawings and the corresponding portions of the description are given purely by way of illustration of the invention which is not to be considered as being limited to the embodiments shown.

MORE DETAILED DESCRIPTION

Figure 1:
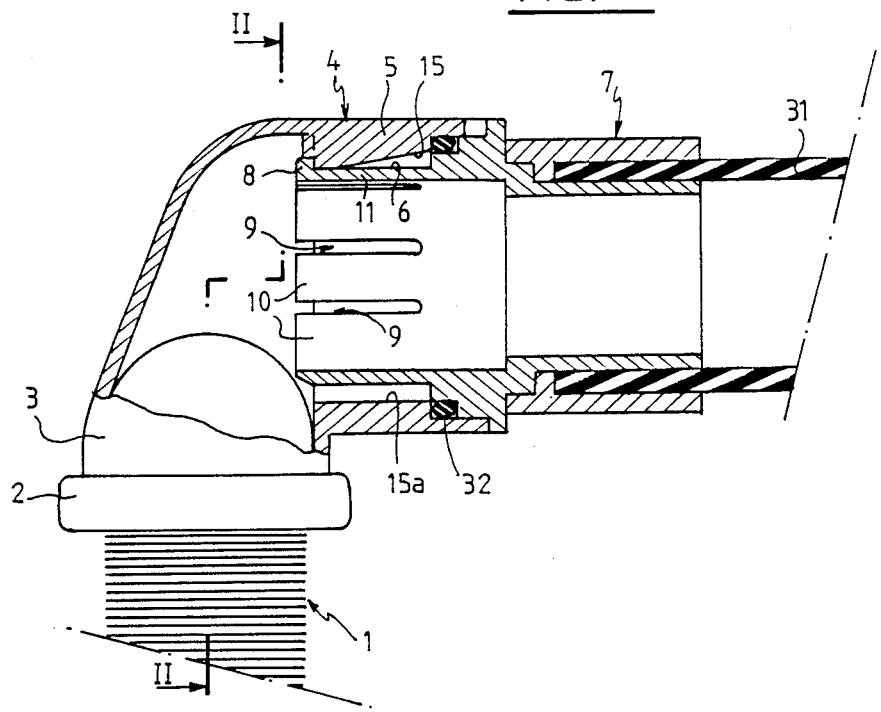
FIG. 1 is a plan view in partial section showing the water box of a heat exchanger assembled to a pipe union.

In FIG. 1, reference numeral 1 designates a diagrammatic representation of the bundle of heat exchanger tubes in a vehicle radiator, and reference 2 designates the perforated plate interconnecting the tubes in the bundle (not shown individually) and the water box 3.

The water box has a connection tube 4 provided with an internal annular shoulder 5 for engaging in a neck 6 on a pipe union 7 connected to a flexible pipe 31 of the so-called "Durit" type made of an elastomer-based material.

The neck 6 is delimited at the leading end of the pipe union 7 inside the tube 4 by an outwardly directed discontinuous flange constituted by snap-fastening catches 8 which bear against the shoulder 5 of the tube and which are uniformly spaced around the entire circumference of the leading end of the pipe union.

Axial slots 9 separate catch-free cylindrical portions 10 at the end of the pipe union 7 from catch-bearing finger portions 11 which extend axially and are radially resilient.

The annular shoulder 5 of the tube includes a first plurality of grooves 12 (see FIGS. 2 and 3) for passing the fingers 11 and their catches 8 in order to bring the union 7 into its locking position.

A second plurality of grooves 13 is intended to pass out the fingers 11 and their catches 8 in order to release the union 7, after said fingers have been moved into alignment with the notches 13 (i.e. into an unlocking position) by rotating the union away from its above-mentioned locking position in which the fingers are aligned with the grooves 12. (The grooves 12 can thus be called "entrance grooves" and the grooves 13 can be called "exit grooves".)

It may be observed (see FIG. 3 in particular) that each groove 12 lies between two grooves 13 and is separated from each of them by respective portions 14 of the shoulder 5. The cylindrical portions 10 of the union 7 slide along these portions 14 which thus constitute guide means for the union.

In order to enable the catches 8 to penetrate into the tube 4, the entrance grooves 12 have flared surfaces 15, thereby enabling the catches 8 to be provided with leading end surfaces which are cylindrical.

The bottoms of the exit grooves 13 have cylindrical surfaces 15a, since in order to release the catches it suffices to ensure that the depth of the notches 13 is substantially equal to the radial extent of the catches 8.

The depth of the entrance notches 12 decreases going into the tube 4.

Figure 2:
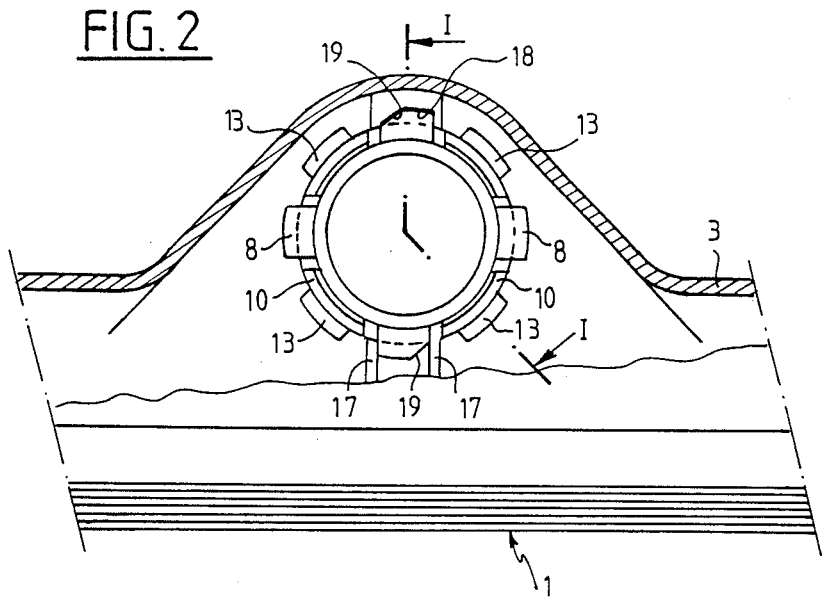
FIG. 2 is a view on II of the FIG. 1 assembly (with FIG. 1 being a section of I of FIG. 2)

FIG. 2 shows that in order to avoid any unwanted rotation of the union after it has been put into place, two diametrically opposite catches 8 are imprisoned in the locking position between pairs of radial locking ribs 17 fixed to the shoulder 5 of the tube 4. In order to release the catches from these ribs 17 by rotating the union 7, each catch includes a chamfer 19 on one side of its radial snap-fastening surface 18.

It is thus clear from the above that in order to lock the union 7 in place, the resilient fingers 11 must be aligned with the entrance grooves 12 so as to prevent them from coming into abutment against the portions 14 of the shoulder.

Similarly, in order to unlock the union, the catches 8 and thus the fingers 11 carrying them must be brought into alignment with the exit grooves 13.

Figure 4:
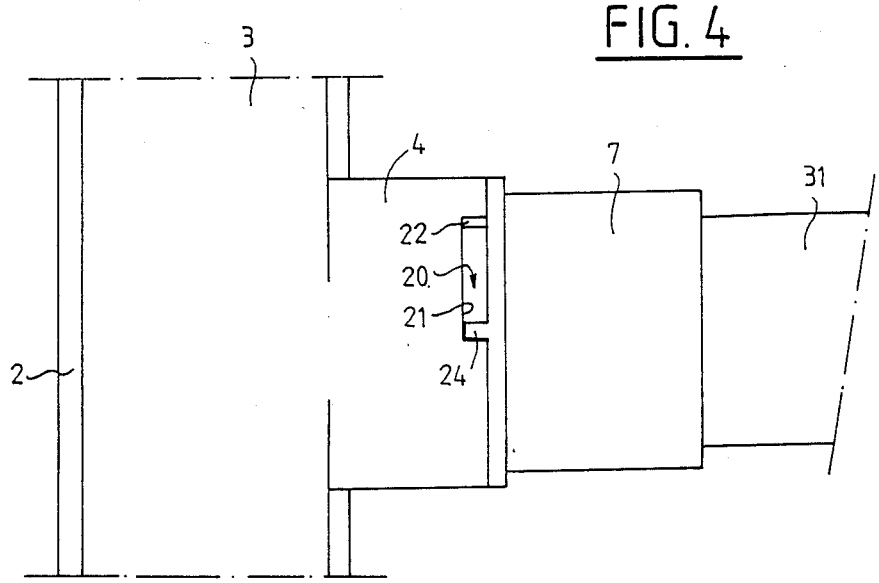
FIG. 4 is a detail view showing means for indexing the assembly.
Figure 3:
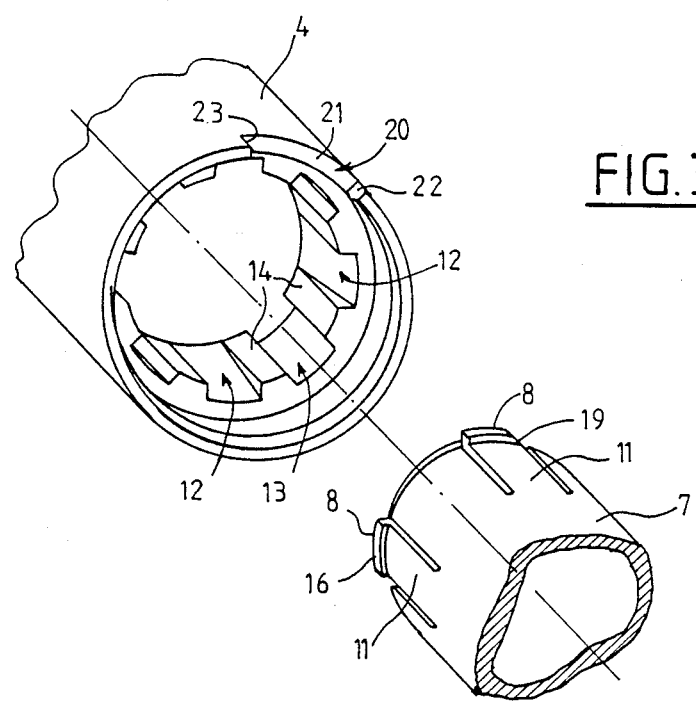
FIG. 3 is a perspective view showing the connection tube of the water box and the pipe union spaced apart and in axial alignment.

To this end, it is advantageous to provide indexing means as shown in FIG. 4 (see also FIG. 3). These figures show a transverse notch 20 provided in the tube 4 and delimited by a radial surface 21 and two axial surfaces 22 and 23, together with an indexing peg 24 carried by the union 7.

The positions of the peg 24 and of the notch 20 are chosen in such a manner that when at least one of the catches 8 has a chamfer such as that shown in FIG. 2 (i.e. disposed on one side only of its radial snap-fastening surface 18 and designated by reference numeral 19), and when the system is in the unlocked position, then the peg 24 comes into abutment against the axial surface 22 of the notch 20 (with the catches 8 being in alignment with the exit grooves 13); whereas when the system is in the locked position, the peg 24 comes into abutment against the axial surface 23 of the notch 20 (with the catches 8 being in alignment with the entrance grooves 12).

Naturally, the positions of the indexing peg 24 and of the notch 20 could be interchanged, i.e. The notch could be provided on the pipe union and the indexing peg could be carried by the tube.

FIGS. 5 to 7 show variant embodiments of the catches 8 and of the entrance grooves 12 in comparison with the embodiment shown in FIGS. 1 to 3.

It may be observed that the entrance grooves 12 no longer have flared bottoms, but are provided with cylindrical bottoms 25, and that this requires the catches 8 to be formed with tapering leading surfaces 26 instead of cylindrical leading surfaces 16 as shown in FIG. 1.

Given that the exit grooves 13 also have cylindrical bottom surfaces, the only difference between the two types of groove in FIGS. 5 and 7 lies in their depths, with the entrance grooves being shallower so as to force the catches 8 radially inwardly when the union is engaged in the tube 4 by virtue of their tapering leading surfaces 26.

FIG. 8 is a fragmentary section on plane VIII of FIG. 5 and it shows a variant embodiment of the indexing means which differs from that shown in FIG. 4. The tube 4 has a swelling 27 while the union has a tab 28 supporting a removable indexing peg 29. The peg 29 is carried by the tap 28 and is received in the swelling 27. the positions of the swelling 27 and of the tab 28 are selected in such a manner that when the peg 29 is received in the swelling 27 (which is then axially aligned with the tab), then the union 7 is locked in place (its catches 8 are engaged behind the shoulder 5). When the peg 29 is removed from the tab 28 and withdrawn from the swelling 27, the unlocking position for the union 7 may be identified by means analogous to those shown in FIG. 4, i.e. by rotating the union 7 until it comes into abutment against one or other of two radially extending projections 30a and 30b on the tube 4 (see the diagram of FIG. 9).

This means that when the tab 28 is locked to the swelling 27 by the peg 29 (which corresponds to the middle position shown in FIG. 9), then the union is locked in place, whereas when the tab (which is integral with the union) is located in either its top position or its bottom position (as shown in dot-dashed lines in FIG. 9), then the union is in an unlocked position. These two, top and bottom unlocked position are located on either side of the intermediate, locked position.

FIG. 8 shows a variant of the means for locking the snap-fastening catches which differs from the combination of the radial ribs 17 and the chamber 19 shown in FIG. 2. This variant comprises a combination between an axial snap-fastening surface 34 in the form of a projecting V-shape on the catch 8 which engages in a V-shaped axial notch 35 in the inside shoulder 5 of the tube 4, with said V-shapes being shown by dashed lines. In this case, the catch has two chamfered surfaces defined by the two sides of its projecting V-shape, and in the position where the assembled tube and pipe union are unlocked, the indexing peg of the indexing means described with reference to FIG. 4 comes into abutment with one or other of the axial surfaces 22 and 23 of the notch 20, whereas in the locking position the peg 24 lies in the middle of the notch 20.

Whichever variant is used, sealing is obtained by means of an elastomer sealing ring 32 disposed between the inside shoulder of the tube and an outside shoulder 33 on the pipe union, with the sealing ring being radially compressed between the pipe and the union when the assembly is locked together.

As can be seen from the above, the invention is not limited in any way to the particular embodiments that have have been described in detail. On the contrary, the invention covers any variant that springs to the mind of the person skilled in the art without going beyond the scope of the accompanying claims. In particular, it should be emphasized that the fixing the pipe union made of plastic material to the flexible pipe made of elastomer may be done not only by the end of the pipe being imprisoned between the union and a plastic material ring molded directly onto the pipe (as shown in FIG. 1), or by bonding as obtained by molding the plastic material pipe union directly over the elastomer pipe (as shown in FIGS. 5, 6, and 8), but also by clamping a metal collar around the pipe, or by gluing, or by any other equivalent means.

I claim:

1. A connection system for interconnecting a heat exchanger and a pipe union, with the pipe union opening out into a connection tube of a water box of the heat exchanger, the pipe union being fixed firstly to a flexible pipe by permanent connection means, and secondly to the tube by resilient connection means constituted by co-operation between an annular neck formed in the union and an internal annular shoulder formed in the tube and intended to engage resiliently in said neck, with sealing being provided by an elastomer ring for being radially compressed between the tube and the union, wherein:

said neck is delimited at the leading end of the pipe union by a snap-fastening·flange for engaging the internal shoulder of the tube, which flange is discontinuous and constituted by snap-fastening catches which are uniformly spaced around the circumference of said leading end;

the neck includes portions which are delimited by said snap-fastening catches alternating with portions which are not delimited by snap-fastening catches, with those portions of the neck which are not delimited by snap-fastening catches being separated from those portions which are delimited by snap-fastening catches by means of axial slots extending from the leading end of the union over substantially the entire length of the neck, thereby dividing the end of the union into a plurality of axial fingers which carry said catches and which are radially resilient, and a plurality of cylindrical portions for guiding the union inside the tube;

said internal annular shoulder of the tube is also discontinuous, in a manner complementary to said snap-fastening flange, said shoulder comprising a first plurality of axial grooves and a second plurality of axial grooves, with each groove in the first plurality:

being intended to pass a corresponding finger with its snap-fastening catch while the union is being assembled to the tube;

being located between two grooves of said second plurality; and being separated from said grooves of said second plurality by projecting shoulder portions over which said cylindrical portions of the pipe union slide;

whereas each groove of said second plurality serves for releasing a corresponding finger when disconnecting the union from the tube, by rotating the union so as to bring its fingers from a locking position in which they are in alignment with said grooves of the first plurality to an unlocking position in which the fingers are in alignment with the grooves of said second plurality.

2. A system according to claim 1, wherein the snap-fastening catches have cylindrical leading surfaces and the grooves of said first plurality have flared bottoms for camming them radially inwardly, whereas the grooves of said second plurality have bottoms constituting a cylindrical surface.

3. A system according to claim 1, wherein the snap-fastening catches have tapering leading surfaces enabling them to be cammed radially inwardly by the grooves of said first plurality which have bottoms constituting a cylindrical surface as do the grooves of said second plurality.

4. A system according to claim 1, wherein the catch of at least one of the resilient fingers is imprisoned in the locked position between two radial locking ribs, and wherein said catch includes a catch-releasing chamfer in a radial snap-fastening surface for passing from the locked position to the unlocked position.

5. A system according to claim 1, wherein the catch of at least one of the resilient fingers has an axial snap-fastening surface in the form of a projecting V-shape, said surface engaging in an axial V-shaped notch formed in the internal shoulder of the tube.

6. A system according to claim 4, wherein a transverse notch is provided in the leading edge of one of the tube and the pipe union, said notch being delimited by a radial surface and by first and second axial surfaces, and wherein an axial indexing peg is carried by the other one of the tube and the pipe union, said notch and said peg being disposed in such a manner that when the peg comes into abutment against one of the axial surfaces of said notch, the union is in its locked position, whereas when the peg comes into abutment against the other axial surface of said notch, the union is in its unlocked position.

7. A system according to claim 5, wherein a transverse notch is provided in the leading edge of one of the tube and the pipe union, said notch being delimited by a radial surface and by first and second axial surfaces, and wherein an axial indexing peg is carried by the other one of the tube and the pipe union, said notch and peg being disposed in such a manner that when the peg comes into abutment against either of the axial surfaces of the notch, the union is in its unlocked position, whereas when the peg is in an intermediate position equally spaced from said axial surfaces of the notch, the union is in its locked position.

8. A system according to claim 4, wherein the tube includes a swelling for co-operating with a tab on the pipe union, said tab supporting a removable indexing peg intended to be received in said swelling, said swelling and said tab being disposed in such a manner that when they are in axial alignment, the union is in its locked position, whereas the union is in its unlocked position whenever its tab comes into abutment against one or other of two radial projections provided on either side of said swelling and engaged by rotating the union away from its locked position after initially removing the indexing peg at least from the swelling.

9. A system according to claim 5, wherein the tube includes a swelling for co-operating with a tab in the pipe union, said tab supporting a removable indexing peg intended to be received in said swelling, said swelling and said tab being disposed in such a manner that when they are in axial alignment, the union is in its locked position, whereas the union is in its unlocked position whenever its tab comes into abutment against one or other of two radial projections provided on either side of said swelling and engaged by rotating the union away from its locked position after initially removing the indexing peg at least from the swelling.

* * * * *